Sept. 22, 1959     H. H. C. CHRISTIANSEN     2,905,103
SELF-PROPELLING CAR SHUNTER Filed April 13, 1956     2 Sheets-Sheet 1

INVENTOR.
Heinrich H. C. Christiansen
BY
Patent Agent

Sept. 22, 1959     H. H. C. CHRISTIANSEN     2,905,103
SELF-PROPELLING CAR SHUNTER Filed April 13, 1956     2 Sheets-Sheet 2

INVENTOR.
Heinrich H.C. Christiansen
BY

United States Patent Office 2,905,103
Patented Sept. 22, 1959

2,905,103

SELF-PROPELLING CAR SHUNTER

Heinrich H. C. Christiansen, Pinneburg, near Hamburg, Germany, assignor to Rockwell Gesellschaft mit beschrankter Haftung, Hamburg, Germany Application April 13, 1956, Serial No. 578,122

5 Claims. (Cl. 105—90)

The present invention relates to single-wheeled motor driven car shunters, in which the necessary friction between the driving wheel of the shunter and the ground or the rail for the car to be moved is obtained by applying a part of the weight of the car to the shunter. In heretofore known shunters of this type, a casing tiltable around the axis of the motor driven wheel mounted in said casing is provided with a push bar and with guiding and controlling handles for the operator. The said handles are connected to the casing by way of a frame adapted to turn in a horizontal plane in respect to the casing, thus allowing the operator to guide and control the shunter either from behind or from the side of the car to be moved.

It is an object of this invention to increase the versatility of a shunter of the above mentioned type to facilitate its use and increase its efficiency. To this end, the shunter according to the invention is provided with additional pushing means suitably mounted below the push bar and in front of the driving wheel. Said additional pushing means will enable the shunter to be used also for moving vehicles considerably lower than railway cars, e.g. mining cars. The main push bar may or may not form part of said additional pushing means, which in the one case has its own push bar or front plate and in the other case may make use of the thrust head of the main push bar detached from its normal seat.

Figure 1:
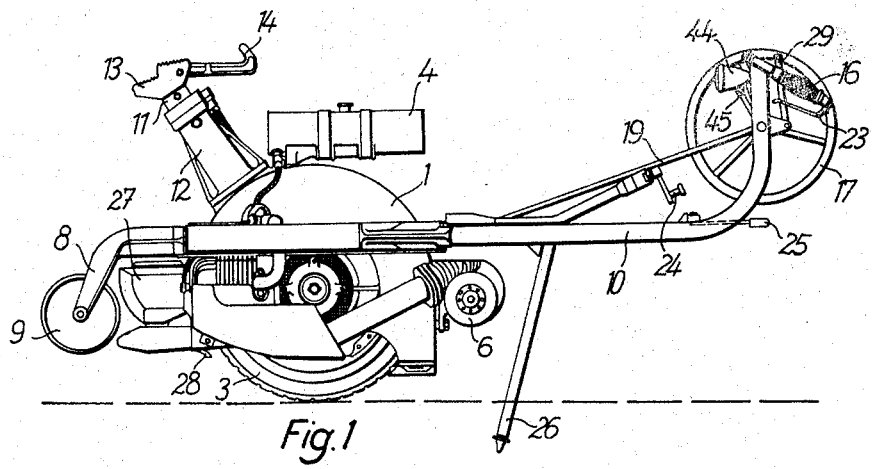
Figure 2:
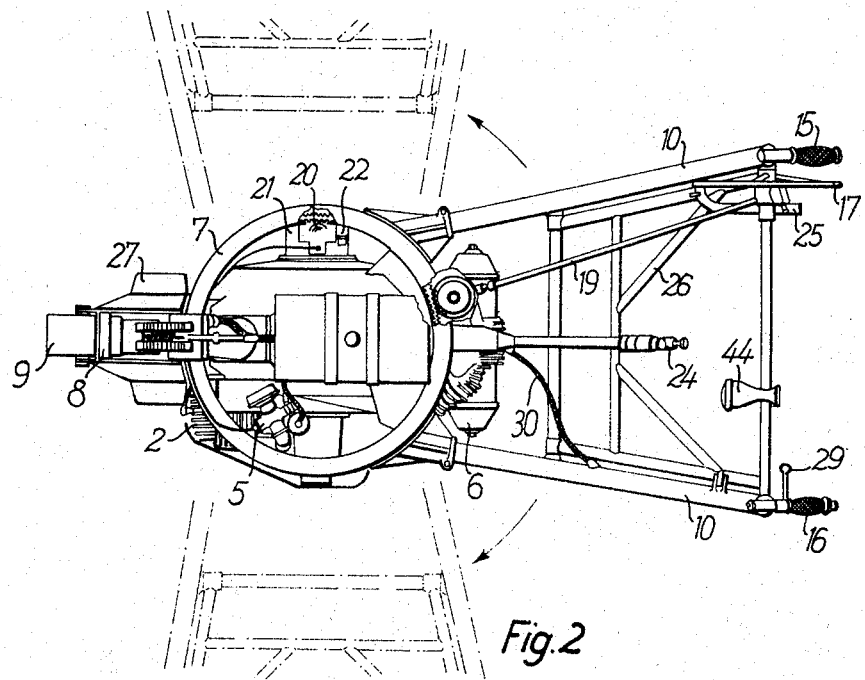
Figure 3:
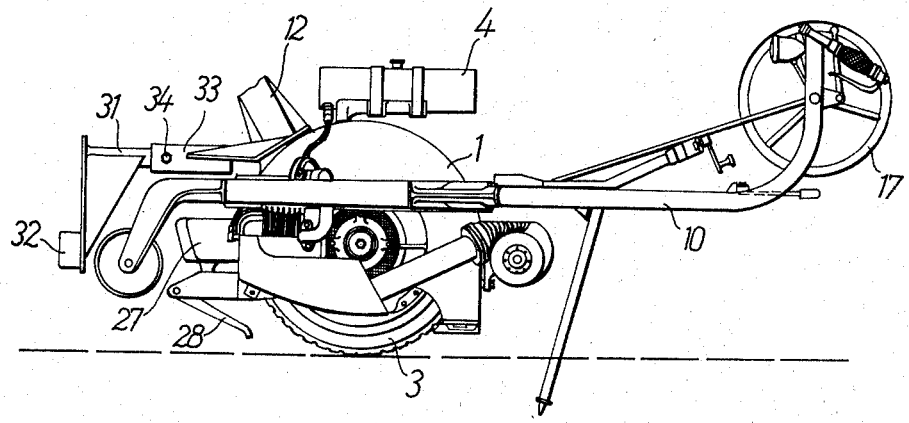

Further features of this invention regarding operating and efficiency of the shunter will be described by way of example in connection with the accompanying drawings in which, in more or less diagrammatic representation:

Figs. 1 and 2 are side elevation and plan view respectively of a shunter according to the invention, Fig. 3 is a partial view of a modification.

In the embodiment according to Figs. 1 and 2, a helmet-shaped casing 1 supports an engine 2 and a wheel 3 driven by said engine. The driving and gear changing connections between the engine 2 and the wheel 3 are not shown in the drawing and are located inside said wheel. A fuel tank 4, carburetor 5, muffler 6 and their pipework are likewise fixed to the casing 1. The reference 7 designates an annular frame supported by the casing 1 and rotatable in a horizontal plane in respect to said casing. A bracket 8 for a jockey wheel 9 in front of the driven wheel 3 and a pair of arms 10 behind the casing 1 extend from the frame 7 and may be brought into the positions shown in dash lines by rotating frame 7 in the direction of the arrows in Fig. 2.

A push bar or thrust claw 11 is adjustably mounted in the manner of a lifting jack in a base 12 fixed to the casing 1 and has its head stepped as at 13 for engagement with the bottom edge of a car body to be moved. A coupling hook 14 connected to said head will secure the push bar or thrust claw 11 to the car to be moved in operation if so desired.

For guiding and controlling the shunter, two handles 15 and 16 are mounted to the free ends of the arms 10, the handle 15 being rigidly fixed to its arm, whereas the handle 16 is adapted to be turned about its longitudinal axis for controlling the throttle of engine 2. Near the guiding handle 15, a hand-wheel or gear change wheel 17 is rotatably mounted on a cross bar 18 of arms 10 for shifting the gears of the power transmission. The gear change wheel 17 by way of bevel-gears (not shown) turns the transmission rod 19 and the spur wheel 20, which in turn moves the change gears of the transmission inside the gear box 21. The actual position of the gears is indicated by respective numerals in a spy-hole 22 of the gear box 21 which numerals are visible to the operator.

The gear change wheel 17 is designed for shifting the annular frame 7 including the parts supported thereby around the vertical axis of the casing 1. Normally, however, the annular frame 7 is locked against rotation with regard to casing 1 and is actuated merely in connection with a gear changing operation. Releasing the locking lever 23 of the turnable handle 16 frees a latch (not shown) of the frame, so that rotation of the gear change wheel 17 may rotate frame 7 by way of the transmission rod 19 and spur wheel 20.

The thrust claw 11 may be raised or lowered in its base 12, to adapt it to the vehicle to be engaged by its head. To this end, a crank 24 is located between the arms 10 and is drivingly connected to a nut supporting the shaft of the thrust claw 11 in the same manner as the threaded ram of a telescoping lifting jack.

The crank 24 as well as the gear change wheel 17 and the locking lever 23 are situated in close proximity to the handles 15 and 16 for the operator, who consequently can perform all guiding, controlling and adjusting work from his place between these handles. Furthermore, a latching lever 25 is provided near the end of the right-hand bar 10 to lock a propstand 26 in its position of rest (Fig. 2). By merely releasing the latch 25 by means of the knee of the operator, the propstand 26 drops into the position shown in Fig. 1 and allows the shunter to be parked when not in use.

Skidding of the driving wheel 3 on dirty or ice-covered ground or rails will be prevented by actuating a sanding device in front of wheel 3. The sanding device comprises a sand box 27 fixed to the casing 1 and opening into a tube-like extension 28 which is tiltably mounted on said sand box 27. Tilting of the extension 28 is effected by a lever 29, which according to its respective positions closes or frees the outlet of the sand box 27. In its opening position, the extension 28 guides the sand leaving the box 27 directly to the ground in front of the wheel 3 and—in the case of operating the shunter on a rail—to the surface of said rail. The cable connecting the lever 29 to the extension 28 as well as the cables extending from the throttle twist-handle 16, crank 24, and locking lever 23 are guided by a common flexible tube 30 partially enclosed by the left-hand arm 10.

The shunter according to Figs. 1 and 2 is designed to move railway cars and other vehicles, the bottom face of which lies high enough as to be gripped or engaged by the thrust claw at least in its lowest position. For lower built vehicles such as mining car, the embodiment according to Fig. 3 shows an additional pushing appliance consisting in a flat-headed ram 31. The vertical thrust face of the ram 31 has mounted thereon a buffer 32 of rubber or other resilient material to protect the frame or other part of the car to be shunted. The ram 31 itself is supported by a tube 33 fixed to the casing 1 in front of the wheel 3 and clear from the annular frame 7. The ram 31 is adjustable relative to and in longitudinal direction of the tube 33 and may be secured in its position by a locking bolt 34.

In some cases it may be preferred to use a push bar or thrust claw in connection with low built cars. To this end, the main thrust claw 11 is removed from its base 12 and inserted into the tube 33 instead of the flat-headed ram 31. The head of the thrust claw 11 is, by means of its coupling hook 14, capable of being secured to a grip, rail or frame part of the car to be shunted, thus allowing the car to be braked by the shunter during and after shunting.

For work at night-time the shunter may be provided with its own headlamp. According to Figs. 1 and 2 such headlamp 44 is mounted to the cross-bar 18 by means of a ball-joint socket 45. The current for the headlamp 44 is derived from the ignition system of the engine 2.

All parts and accessories of the engine 2 may, if so desired, be made fire-proof and protected against explosions, to enable the shunter to be used in gas-filled rooms or near inflammable substances such as fuel. To this end the ignition system, the air intake of the carburetor 5 and the outlet of the muffler 6 are secured in a manner customary for this kind of accessories, whereas the exhaust pipes are heat-insulated by suitable covers. Preferably these protecting means are sealed against undue access and removal.

What I claim is:

1. In a single wheel self-propelled car shunter having a casing supported by said wheel and tiltable about the axis of rotation thereof: a first cylinder supported by said casing and in normal shunting position of said shunter extending upwardly at an acute angle with regard to the horizontal plane passing through the axis of rotation of said wheel, a first push rod adjustably mounted in said first cylinder and provided with means for selective engagement with a car to be shunted, a second cylinder connected to said casing at a level lower than said first cylinder and forming an acute angle with the latter, a second push rod adjustably mounted in said second cylinder, said second push rod being provided with means for selective engagement with the car to be shunted, an engine supported by said casing and drivingly connected to said wheel, an annular frame carried by said casing and rotatable relative thereto about an axis substantially perpendicular to the axis of rotation of said wheel, a jockey wheel, bracket means supported by said annular frame and rotatably supporting said jockey wheel, the means with which said second push rod is provided being arranged in front of said jockey wheel, guiding means connected to said annular frame for guiding said shunter, and control means arranged adjacent said bracket means and operatively connected with said engine for controlling the latter.

2. A car shunter according to claim 1 which comprises two separate individually locking means for respectively locking said first and said second push rods in their respective desired positions.

3. A car shunter according to claim 1, in which said second push rod is in the form of a flat-headed ram.

4. A car shunter according to claim 1, in which said second push rod is provided with resilient buffer means arranged in front of said jockey wheel and at a level lower than said second cylinder.

5. In a single wheel self-propelled car shunter having a casing supported by said wheel and tiltable about the axis of rotation thereof: a first cylinder supported by said casing and in normal shunting position of said shunter extending upwardly at an acute angle with regard to the horizontal plane passing through the axis of rotation of said wheel, a push rod adjustably mounted in said first cylinder and selectively removable therefrom, said push rod being provided with means for selective engagement with a car to be shunted, a second cylinder connected to said casing at a level lower than said first cylinder and forming an acute angle with the latter, said second cylinder being adapted selectively adjustably to receive said push rod with the means connected thereto for engagement with a smaller car to be shunted, an engine supported by said casing and drivingly connected to said wheel, an annular frame carried by said casing and rotatable relative thereto about an axis substantially perpendicular to the axis of rotation of said wheel, a jockey wheel, bracket means supported by said annular frame and rotatably supporting said jockey wheel, said jockey wheel being located at a level lower than the level of said second cylinder, guiding means connected to said annular frame for guiding said shunter, and control means arranged adjacent said bracket means and operatively connected with said engine for controlling the latter.

References Cited in the file of this patent

UNITED STATES PATENTS

| | | |
|---|---|---|
| 2,051,821 | Christiansen | Aug. 25, 1936 |
| 2,057,230 | Collison et al. | Oct. 13, 1936 |
| 2,350,437 | Wiedman | June 6, 1944 |
| 2,590,143 | Adams et al. | Mar. 25, 1952 |
| 2,682,231 | Jackson | June 29, 1954 |
| 2,720,407 | Mermelstein | Oct. 11, 1955 |
| 2,725,988 | Miller | Dec. 6, 1955 |